UNITED STATES PATENT OFFICE.

WALTER ALEXANDER AND JOHN E. CLEGG, OF NEW YORK, N. Y.

COATING COMPOSITION AND PROCESS OF PRODUCING SAME.

1,358,914.   Specification of Letters Patent.   Patented Nov. 16, 1920.

No Drawing.   Application filed September 25, 1917. Serial No. 193,068.

*To all whom it may concern:*

Be it known that we, WALTER ALEXANDER and JOHN E. CLEGG, citizens of the United States, residing in the borough of Manhattan, in the city, county, and State of New York, have invented and discovered certain new and useful Improvements in Coating Compositions and Processes of Producing Same, of which the following is a specification.

Our invention relates to a process of manufacturing a composition of matter and to a composition, compound or product adapted to and designed for various purposes, and particularly to act as a coating composition capable of application as a finish or paint, for decorative, preservative, and protective purposes.

The object of our invention is the production of a composition adapted to be applied to vitreous surfaces, to metal, wood, leather, fabric or other preferably smooth or polished surfaces, in the form of a coating, to produce thereupon a decorative film having a mat or frosted appearance, with which may be embodied suitable pigments for the production of desired color effects, and which shall be enduring as to color; and which also shall act as a preservative to woods and fabrics, and as a protective coating for metal surfaces; which shall be non-inflammable and not readily combustible, and which shall be simple of application and capable of manufacture commercially at low cost.

Our composition consists of a mixture of cellulose, such as cellulose esters, and a boron compound, such as boracic acid, and a suitable solvent capable of dissolving both the cellulose and the boron compound, acetone, methyl ketone, or ethyl methyl-acetone, or, as the latter is commercially termed "methyl-acetone." As a composition containing a cellulose ester, celluloid, preferably in the form of a pyroxylin varnish, will be found not only suitable but convenient because of its cheapness.

In making this compound we first dissolve the boron compound in the common solvent, preferably to the point of saturation, and after solution filter the solution; we next incorporate with this solution the cellulose ester separately dissolved in the common solvent and preferably to the point of saturation and intimately mix the solutions by agitation, and finally filter it. This resultant coating composition may be applied as a liquid to the surface to be coated by dipping the articles therein, or by spreading the mixture thereon either with a brush or with a suitable atomizing spray. If desired, the volatile solvent may be evaporated, the evaporation being hastened by heat, and the composition packaged as a dry product.

As a specific example of proportions of the several ingredients and the formula of their admixture in our composition, we find the following proportions to be those now best known to us in the practical application of our discovery:

Of the saturated solution of boracic acid in methylacetone, 605 fluid ounces; of pyroxylin varnish, 245 fluid ounces.

The pyroxylin varnish should be substantially of the following formula:

Methylacetone___ 105 fluid ounces.
    Amylacetate ____ 115 fluid ounces.
    Celluloid _____ 25 fluid ounces.

It will be found advantageous in making the saturated solution of boracic acid in methylacetone, if the boracic acid be preheated until its water of crystallization is driven off, as a larger quantity of the boron is then dissolvable in the solvent and the solution itself is of a superior quality.

These ingredients are mixed as above described. Upon application, the resultant film will produce a white frosted effect. As applied to glass, the film is translucent and of a pleasing quality of brilliance, being soft, mellow and lustrous. When it is desired to form a color film, suitable pigments may be added thereto in the solution, either anilin colors or metallic powders, as desired. While it is preferable to saturate the common solvent with the boron compound in order to load the coating composition with the maximum amount of material to be deposited, excellent results in lesser degree may be attained without complete saturation therewith. Similarly, excellent results may be attained without complete saturation of the common solvent with celluloid or other cellulose ester, but the optimum effect as to permanence and durability is secured by the preferred quantity as well as evenness of distribution and translucence.

Having thus described our invention broadly and the best method now known to us of making and compounding the same, but without desiring thereby to be understood as limiting the scope or application thereof to the specific example recited, we claim:

1. The process of producing borated cellulose consisting in dissolving a boron compound in a solvent thereof until a saturated solution is obtained, and mixing therewith a solution of cellulose.

2. The process of producing borated cellulose consisting in dissolving a boron compound in a volatile solvent until a saturated solution is obtained, dissolving cellulose in said solvent until a solution of cellulose is obtained, mixing said solutions, and driving off the solvent.

3. The process of producing borated cellulose consisting in driving off the water of crystallization from boracic acid, dissolving said acid and mixing with the solution thereof a solution of a cellulose ester.

4. The process of producing a borated cellulose ester consisting in dissolving a boron compound in a solvent having the capacity to dissolve cellulose esters and so continuing until such solvent is saturated, separately dissolving a cellulose ester in the same solvent and mixing the resultant solutions, the quantity of saturated solution of the boron compound being in excess of that of the solution of cellulose ester.

5. The process of producing borated cellulose esters consisting in dissolving boracic acid in a volatile solvent and filtering the solution; dissolving a cellulose ester in the same solvent, and mixing the two solutions.

6. A composition comprising a cellulose ester, a boron compound, the boron compound being in excess, and a solvent capable of dissolving both.

7. A coating composition consisting of cellulose ester mixed with boracic acid, the latter being in excess by weight.

8. A liquid coating composition composed of a cellulose ester and a boron compound dissolved in a common solvent saturated therewith.

9. A liquid coating composition composed of a cellulose ester, boracic acid from which the water of crystallization has been driven off, and a common solvent.

10. A non-inflammable liquid coating composition consisting of a saturated solution of boracic acid and methyl-ethylacetone mixed with a solution of pyroxylin, the quantity of boracic acid exceeding that of the pyroxylin.

WALTER ALEXANDER.
JOHN E. CLEGG.